Oct. 5, 1926.

C. R. HELDT 1,602,304

VALVE GUIDE SEAL

Filed August 5, 1925

P. T. Hickey.

WITNESS:

Carl R. Heldt,
INVENTOR

BY Victor J. Evans

ATTORNEY

Patented Oct. 5, 1926.

1,602,304

UNITED STATES PATENT OFFICE.

CARL R. HELDT, OF STANFORD, ILLINOIS.

VALVE-GUIDE SEAL.

Application filed August 5, 1925. Serial No. 48,412.

This invention relates to improvements in internal combustion engines and has for an object the provision of means which may be easily applied to the valve stems so as to reduce wear upon the stems and guides and prevent the passage of air through the guides into the engine cylinders.

Another object of the invention is the provision of means which in addition to the above and other advantages, is simple in construction, reliable in use and capable of being attached to engines of various types.

With the above and other objects in view, the invention further includes the following novel features and details of construction, to be hereinafter more fully described, illustrated in the accompanying drawings and pointed out in the appended claim.

In the drawings:—

Figure 1:
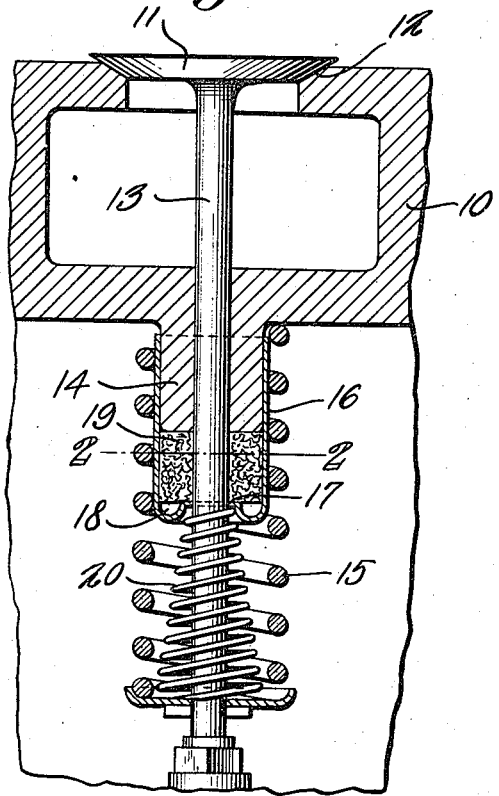
Figure 1 is a sectional view illustrating the application of the invention to a valve.
Figure 3:
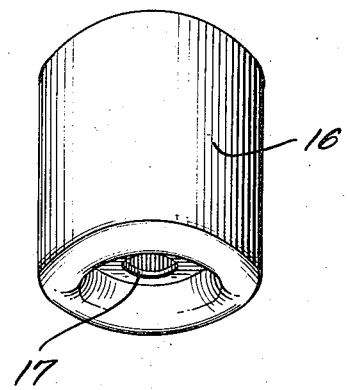
Figure 3 is a detail perspective view of the receptacle.
Figure 4:
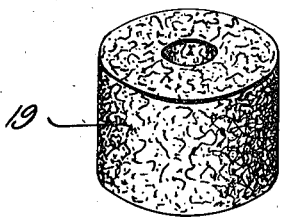
Figure 4 is a similar view of the absorbent member or packing.
Figure 2:
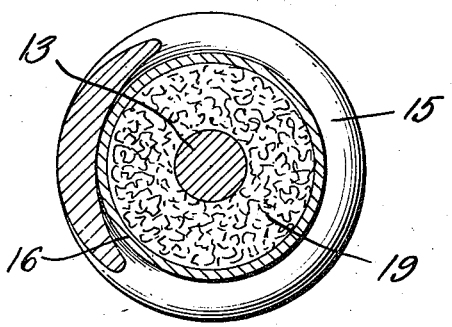
Figure 2 is an enlarged sectional view on the line 2—2 of Figure 1.

Referring to the drawings in detail wherein like characters of reference denote corresponding parts, the reference character 10 indicates a portion of the housing of an internal combustion engine, 11 one of the valves, 12 its seat and 13 the valve stem, the latter operating through a valve guide 14 while a spring 15 acts to seat the valve. The elements mentioned form a part of the usual type of L head engine and while the invention is shown as applied to an engine of this character, it is equally well adapted for engines equipped with overhead valves.

The invention comprises a receptacle 16 which is suitably formed of thin metal and has a working fit upon the guide 14, one end of the receptacle being provided with an opening 17 for the free passage of the valve stem 13. The bottom of the receptacle is provided with an annular transversely curved oil reservoir 18, while positioned within the receptacle around the stem 13 is an absorbent member or packing 19. A relatively weak spring 20 bears against the bottom of the receptacle 16 and acts to sufficiently compress the member 19 to prevent air from passing into the engine cylinder through the guide 14. This is important in intake valves and results in a smoother running and easier starting engine. Lubricant from the reservoir 18 will be absorbed by the member 19 and the latter will keep the stem 13 properly lubricated to reduce wear and eliminate danger of warping and sticking of the valve. The spring 15 in addition to properly maintaining the receptacle 16 in place, also acts to compress or squeeze the member 19 at each upward movement of the valve stem and thus insure positive transfer of the lubricant to the stem.

When the receptacle is inverted for use with overhead valves, oil is supplied to the member 19 around the stem of the valve, the depression in the end of the receptacle formed by the walls of the annular reservoir 18, acting to direct oil into the receptacle.

The invention is susceptible of various changes in its form, proportions and minor details of construction and the right is herein reserved to make such changes as properly fall within the scope of the appended claim.

Having described the invention what is claimed is:—

In combination with the valve of an internal combustion engine, a receptacle positioned over the valve guide and having an opening in its inner end for the passage of the valve stem, an annular transversely curved bottom for the receptacle, said bottom defining an oil reservoir, an absorbent member within the receptacle around the valve stem and between the guide and the oil reservoir and extending across the top of the latter and a relatively light spring surrounding the stem and having one of its ends positioned within a seat formed by the wall of the oil reservoir and bearing against the receptacle to compress the absorbent member.

In testimony whereof I affix my signature.

CARL R. HELDT.